United States Patent
Abedini et al.

(10) Patent No.: US 10,692,013 B2
(45) Date of Patent: Jun. 23, 2020

(54) SOLAR IRRADIATION MODELING AND FORECASTING USING COMMUNITY BASED TERRESTRIAL SKY IMAGING

(71) Applicant: International Business Machines Corporation, Armonk, NY (US)

(72) Inventors: Mani Abedini, Melbourne (AU); Rahil Garnavi, Macleod (AU); Timothy M. Lynar, Kew (AU); Christopher I. E. Mesiku, Brisbane (AU); John M. Wagner, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 15/175,620

(22) Filed: Jun. 7, 2016

(65) Prior Publication Data
US 2017/0351970 A1 Dec. 7, 2017

(51) Int. Cl.
*G06N 20/00* (2019.01)
*G01W 1/10* (2006.01)
*G06T 1/00* (2006.01)
*G06N 7/00* (2006.01)

(52) U.S. Cl.
CPC .............. *G06N 20/00* (2019.01); *G01W 1/10* (2013.01); *G06T 1/0007* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 7,912,644 B2 | 3/2011 | Twitchell, Jr. | |
| 8,669,509 B1 | 3/2014 | Gupta et al. | |
| 8,750,566 B2 | 6/2014 | Guan et al. | |
| 8,796,604 B2 | 8/2014 | Lynass et al. | |
| 8,923,567 B2 | 12/2014 | Yao et al. | |
| 9,007,460 B2 | 4/2015 | Schmidt et al. | |

(Continued)

FOREIGN PATENT DOCUMENTS

| | | | |
|---|---|---|---|
| EP | 2645135 A1 | 10/2013 | |
| EP | 2891904 A1 | 7/2015 | |

(Continued)

OTHER PUBLICATIONS

Prema, V., and K. Uma Rao. "Development of statistical time series models for solar power prediction." Renewable energy 83 (2015): 100-109. (Year: 2015).*

(Continued)

*Primary Examiner* — Alexey Shmatov
*Assistant Examiner* — Casey R. Garner
(74) *Attorney, Agent, or Firm* — Scully, Scott, Murphy & Presser, P.C.; Joseph Petrokaitis

(57) ABSTRACT

Solar irradiation may be predicted based on input terrestrial sky images comprising cloud images, the terrestrial sky images taken from a plurality of geographic locations by a plurality of devices; for example, wherein the terrestrial sky images are crowd sourced from the plurality of devices. A model may be generated that predicts solar irradiation in a geographic area based on the input terrestrial sky images and the geographic locations from where the terrestrial sky images were taken. A signal representing the solar irradiation predicted by the model is output.

18 Claims, 5 Drawing Sheets

(56) References Cited

U.S. PATENT DOCUMENTS

| | | | |
|---|---|---|---|
| 9,069,103 | B2 | 6/2015 | Williams et al. |
| 9,645,180 | B1* | 5/2017 | Hoff .................. G01R 21/1331 |
| 2004/0169770 | A1 | 9/2004 | Widener et al. |
| 2010/0198420 | A1 | 8/2010 | Rettger et al. |
| 2011/0220091 | A1* | 9/2011 | Kroyzer ............. H01L 31/0547 126/572 |
| 2011/0282514 | A1 | 11/2011 | Ropp et al. |
| 2013/0152997 | A1 | 6/2013 | Yao et al. |
| 2014/0278108 | A1* | 9/2014 | Kerrigan ................. G01W 1/10 702/3 |
| 2014/0324352 | A1 | 10/2014 | Hamann et al. |
| 2014/0327769 | A1 | 11/2014 | Hamann et al. |
| 2015/0134251 | A1* | 5/2015 | Bixel ..................... G05B 13/04 702/3 |
| 2015/0177415 | A1 | 6/2015 | Bing |
| 2015/0212236 | A1* | 7/2015 | Haas ....................... G01W 1/10 382/100 |
| 2015/0226827 | A1 | 8/2015 | Aycock et al. |
| 2015/0302575 | A1* | 10/2015 | Sun ......................... G01W 1/12 382/103 |
| 2017/0031056 | A1* | 2/2017 | Vega-Avila ............. G01W 1/12 |
| 2018/0136366 | A1* | 5/2018 | Vega-Avila ............. H02S 40/00 |

FOREIGN PATENT DOCUMENTS

| | | | | |
|---|---|---|---|---|
| WO | WO-2014161082 | A1 * | 10/2014 | ......... G01C 21/3691 |
| WO | WO-2017193172 | A1 * | 11/2017 | ............. G06N 5/003 |

OTHER PUBLICATIONS

Abuella, Mohamed, and Badrul Chowdhury. "Solar power probabilistic forecasting by using multiple linear regression analysis." In SoutheastCon 2015, pp. 1-5. IEEE, 2015. (Year: 2015).*

Pelland, Sophie, Jan Remund, Jan Kleissl, Takashi Oozeki, and Karel De Brabandere. "Photovoltaic and solar forecasting: state of the art." IEA PVPS, Task 14 (2013): 1-36. (Year: 2013).*

Ernst, Bernhard, Frank Reyer, and Joachim Vanzetta. "Wind power and photovoltaic prediction tools for balancing and grid operation." In 2009 CIGRE/IEEE PES Joint Symposium Integration of Wide-Scale Renewable Resources into the Power Delivery System, pp. 1-9. IEEE, 2009. (Year: 2009).*

Alonso-Montesinos, J., et al., "Solar Irradiance Forecasting At One-Minute Intervals for Different Sky Conditions Using Sky Camera Images", Energy Conversion and Management, Sep. 2015, pp, 1166-1177, vol. 105.

Alonso-Montesinos, J., et al., "The Use of a Sky Camera for Solar Radiation Estimation Based on Digital Image Processing", Energy, Jul. 2015, pp. 1-10.

Bernecker, D., et al., "Continuous short-term irradiance forecasts using sky images", Solar Energy, Dec. 2014, pp. 303-315, vol. 110.

Chow, C.W., et al., "Intra-hour forecasting with a total sky imager at the UC San Diego solar energy testbed", Solar Energy, Nov. 2011, pp. 2881-2893, vol. 85, No. 11.

Chu, Y., et al., "Hybrid intra-hour DNI forecasts with sky image processing enhanced by stochastic learning", Solar Energy, Dec. 2013, pp. 592-603, vol. 98, Part C.

Ferreira, P.M., "A Neural Network Based Intelligent Predictive Sensor for Cloudiness, Solar Radiation and Air Temperature", Sensors 2012, Nov. 2012, pp. 15750-15777, vol. 12.

Ghonima, M.S., et al., "A Method for cloud detection and opacity classification based on ground based sky imagery", Atmospheric Measurement Techniques, Nov. 2012, pp. 2881-2892, vol. 5, Issue 11.

IBM, "Research: The Clean Energy Project—Phase 2: Project Overview", World Community Grid, https://secure.worldcommunitygrid.org/research/cep2/overview.do, Accessed on Jun. 6, 2016, 2 pages.

Igoe, D. et al., "Smartphone based Android app for determining UVA aerosol optical depth and direct solar irradiances", Photochemistry and Photobiology, Jan. 2014, 21 pages, vol. 90, Issue 1.

Inman, R.H., "Solar forecasting methods for renewable energy integration", Progress in Energy and Combustion Science, Dec. 2013, pp. 535-576, vol. 39, Issue 6.

Lang, D., et al., "Towards building a Crowd-Sourced Sky Map", Proceedings of the 17th International Conference on Artificial Intelligence and Statistics (AISTATS), Jun. 2014, 9 pages.

Lauret, P., et al., "A benchmarking of machine learning techniques for solar radiation forecasting in an insular context", Solar Energy, submitted Jan. 2015, 28 pages, vol. 112.

Rodrigo, A.S., et al., "Cloud Images Capturing System for Solar Power Level Prediction", Moratuwa Engineering Research Conference (MERCon), Apr. 2015, pp. 301-305.

Su, F., et al., "A local features-based approach to all-sky image prediction", IBM Journal of Research and Development, Mar./May 2015, pp. 1-10, vol. 59, No. 2/3, Paper 6.

Urquhart, B., "Development of a sky imaging system for short-term solar power forecasting", Atmospheric Measurement Techniques Discussions, May 2014, pp. 4859-4907, vol. 7.

West, S.R., et al., "Short-Term Irradiance Forecasting using Skycams: Motivation and Development", Solar Energy, Dec. 2014, 26 pages, vol. 110.

Wisland, L., "How Many Homes Have Rooftop Solar? The Number is Growing . . . ", http://blog.ucsusa.org/laura-wisland/how-many-homes-have-rooftop-solar-644?, Sep. 4, 2014, 5 pages.

Zhang, J., et al., "Metrics for Evaluating the Accuracy of Solar Power Forecasting", 3rd International Workshop on Integration of Solar Power into Power Systems, Oct. 22-23, 2013, 10 pages.

* cited by examiner

US 10,692,013 B2

SOLAR IRRADIATION MODELING AND FORECASTING USING COMMUNITY BASED TERRESTRIAL SKY IMAGING

FIELD

The present application relates generally to computers and computer applications, and more particularly to solar irradiation modeling and prediction based on sky imaging.

BACKGROUND

Solar forecasting is an active research area, but it also has great practical value to individuals outside of research. One example is the prediction and minimization of ultraviolet (UV) exposure by individuals as they plan a day out. Another example is the use of accurate and reliable solar forecasting for electricity producers and energy markets to offer stable energy and prices respectively. This includes the generation of electricity by individuals, given the increase in home solar panels connected to the grid that are now part of that energy market. These examples underscore some of the practicality of solar prediction. Challenges exist, however, to solar prediction. For instance, the perturbations caused by clouds, dusts and aerosols may impede the prediction procedure. Satellite images can be used to predict solar energy over a large area over long time horizons. Other existing high-resolution sky images and solar forecasts may use images acquired for a short time and small spatial distribution. However, these predictions may not be applicable to all scenarios, for example, in the short-term and at specific locations for individual consumers.

BRIEF SUMMARY

A method, system and computer program product for determining solar irradiation may be provided. The method, in one aspect, may include receiving as input terrestrial sky images comprising cloud images, the terrestrial sky images taken from a plurality of geographic locations by a plurality of devices participating as community members. The method may also include characterizing clouds in the terrestrial sky images. The method may further include predicting future shape and position of the clouds in image pixels of the terrestrial sky images by executing a first machine learning model trained to predict cloud positions based on cloud speed, wind speed and direction. The method may also include generating a second machine learning model that predicts solar irradiation in a geographic area based on cloud shape and position. The method may further include executing the second machine learning model to predict the solar irradiation based on the future shape and position of the clouds predicted by the first machine learning model. The method may also include outputting a signal representing the solar irradiation.

A system of determining solar irradiation, in one aspect, may include a hardware processor operable to receive as input terrestrial sky images comprising cloud images, the terrestrial sky images taken from a plurality of geographic locations by a plurality of devices. The hardware processor may be further operable to generate a model that predicts solar irradiation in a geographic area based on the input terrestrial sky images and the geographic locations from where the terrestrial sky images were taken, the geographic locations determined based on cloud-sun line of vision angles. The hardware processor may be further operable to execute the model to predict the solar irradiation. The hardware processor may be further operable to output a signal representing the solar irradiation.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
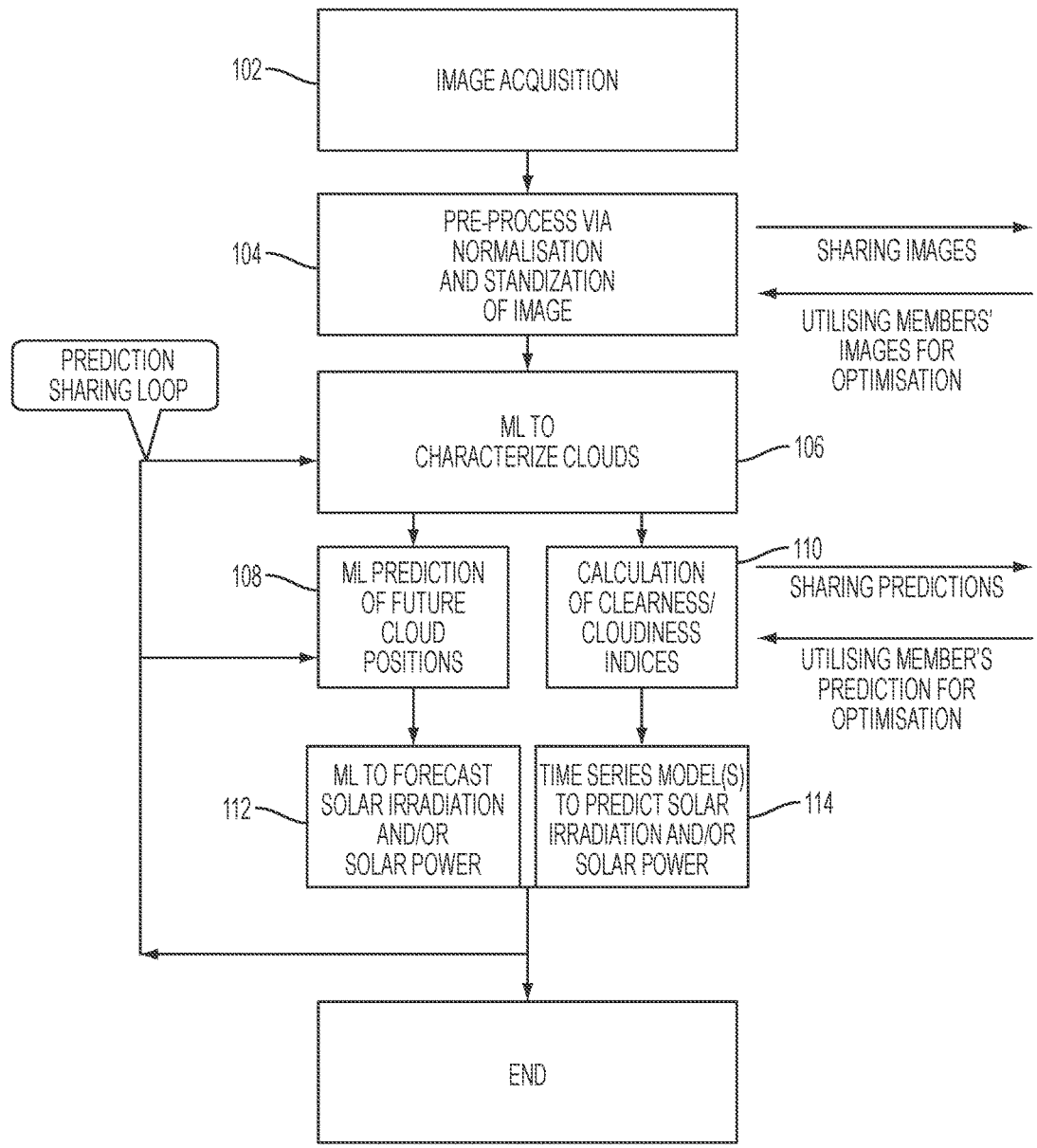
FIG. 1 is a flow diagram illustrating a method in one embodiment of the present disclosure.

A system, method, computer program product and technique may be provided that predict solar irradiation values, for instance, using image analytic of sky imaging. In some embodiment, a system may utilize local sky imaging data as well as other (e.g., nearby within a threshold distance) predictive systems data to improve cloud movement prediction and/or construct a clear border of cloud covering the sun (referred to as circumsolar region challenge). The part of the cloud which is not clearly visible due to sun irradiation may be clearly visible from other sources with different angles or having a distance away from the primary location. In some embodiments, a system may leverage community network of individual predictive systems.

In some embodiments, a system, method, computer program product, and technique may be presented for the establishment of a community network for image acquisition and contribution for constructing dynamical models capable of predicting cloud cover over an extended area. An approach in some embodiments in the present disclosure may provide a solution that permits image acquisition from a large spatial distribution taking into account all spatial prediction horizons while solving the circumsolar region challenge and offering prediction times of potentially extended hours. Providing prediction times of longer time period (e.g., 11 hours) allows the prediction to be provided to users or customers who are off-grid but are connected to a forecasting network. A network in some embodiments of the present disclosure may provide the potential to bring solar prediction to the consumer market and offer Solar Prediction as a Service to others who may not have image acquisition instruments to get their own predictions.

The system and method in some embodiment may include terrestrial sky imaging, building predictive model for forecasting of sun irradiation values, a community network of multiple sky imaging sources to share and/or contribute data (images or predictive models and/or prediction errors) in order to improve the predictive modeling performance, feedback driven grid based network of local prediction systems, short term as well as long term predictions, and suggesting cost model for contributing and/or sharing information in the network and/or grid.

In some embodiments, a citizen science community based approach may be enabled or provided where people are engaged to in image acquisition, for example, for the benefit of sharing image and prediction data with others in the network. In this approach in some embodiment, individuals may contribute sky images and/or prediction data to others and get credit and/or discount. The individuals may use that credit to access other neighbor's prediction data and/or images. The sky images of neighbors may be utilized for circumsolar region. For instance, the border of the cloud covering part of the sun may not be visible in the image, but it can be visible from another angle, with a fair distance from that point. Also a predictive system may update and/or incrementally improve its performance by obtaining feedback from other systems' prediction errors.

A system in some embodiments utilize the vast distance separating the sun and clouds, to obtain networked image acquisition instruments with differing angles of cloud-sun line of vision. The network may be set up by presenting a set of instructions for an increasing number of climate aware citizen scientists, for example, via a user interface. Such a network may make it possible for individuals to predict solar power for their own use and allow the individuals to also choose to offer image and prediction data to others on the network. Such an approach improves the accuracy of future predictions, for example, as a system may learn from previous predictions. Moreover, the prediction horizon may potentially be increased from 10-15 minutes to potentially around 11 hours (12 hours minus one hour (the 5 degrees of zenithal angle at sunrise and sunset (total 10 degrees corresponding to roughly 60 minutes)).

A system in some embodiments providing such a set-up may solve challenges persisting in solar forecasting. For example, the system may offer two solutions for the circumsolar region cloud boundary challenge: relating views from several different instruments and using machine on images from a plurality of different cameras to predict possible cloud shape evolution over a time period, for example, 10-30 minutes; and higher resolution predictions accompanied by short prediction horizons. The system may provide a network of sky image acquisition devices providing improved approximations for the CBH (cloud base height). In one aspect, there may be customers who have limited access to a solar forecasting system. A system in the present disclosure in some embodiments has the potential to be beneficial to those who do not have a camera but would like to have access to predictions, for example, via a fee-for-access model.

The system in some embodiments provide the ability to make solar forecasting cost effective, localized and ubiquitous over short-time scales, for example, for consumer market primarily and may also be applicable on an industrial scale.

Sky imaging systems may be created using mounted webcams or smartphone cameras, or the like. The sky images from one source or multiple sources along with other information such as meteorological data, astronomy information (sun position) is used to calculate sky and/or cloudiness indices which leads to solar irradiation forecasting. Other information may include images or data taken by infrared camera. Having multiple cameras with different look angles or viewing angles allows for determining the boundaries of otherwise invisible circumsolar clouds. Those images may be also used to measure cloud base heights of various level clouds.

In some embodiments, the processing such as a predictive analysis may be performed locally, e.g., on a user device such as a smartphone or another device. An application running on the smartphone phone, for example, may perform a predictive analysis. As an example use case scenario, an individual with a smart phone may use a phone's camera and the phone's processor, for example, central processing unit (CPU) as the processing unit. The results of processing may be uploaded and shared via a cloud platform among network members and potentially offered as a service to non-members.

In some embodiments, the processing may be done remotely, e.g., a remote processor (e.g., a cloud platform processor) may receive the image or image sources and perform the predictive analysis. As an example use case scenario, the individuals may use cameras and/or camera phones as the image source and transmit the images to a remote (e.g. cloud detection as a service) server for processing. The remote processor communicates or transmits the resulting model to network members who can control whether or not to offer results as a service to non-members.

In some embodiment, a system of the present disclosure may use astronomy information in order to aid faster correlation and orientation of the sky images. Correct orientation of the image allows for patching those individual images to create a whole picture of the sky for that particular location and time. Data to correlate includes latitude, altitude, zenith angle, Right Ascension and Declination. These values act to locate and remove saturated circumsolar regions. Such patched images of the sky may provide high resolution, multi-angle images that may be able to resolve velocities of multi-layered clouds. These velocities may then be used for determining cloud base heights.

In some embodiment, the outputs from the system of the present disclosure can be short-term future solar irradiance values and related power output values, sky cover indices and/or day log predictions updated regularly.

FIG. 1 is a flow diagram illustrating a method in one embodiment of the present disclosure. At 102, image is acquired. For example, a community member may take sky images in periodic intervals using webcams, mobile phones camera, and/or another device. The associated meta-data, e.g., the camera angle, position, precise location are gathered. In some embodiments, the meta-data may be manually set and received, or received from one or more sensors sensing the data. The images can be in panoramic view, for example, taken with specific lenses such as fisheye lens. The images may be processed images, for example, processed by a stitching algorithm on top of multiple images and/or video that covers the sky view. Cloud images may be used to predict solar radiation and/or solar power.

At 104, the images may be pre-processed, for example, normalized and/or standardized. This pre-processing improves the quality of the input image. For example, removing external, unwanted, and/or noise objects from the acquired image, de-noising the image in pixel level, enhancing the lights, color intensity, generating panorama view (e.g., by combining multiple images with overlapping fields to produce a wide angle view of the sky) may be performed. The processed images may be shared with others, for example, in a community. For example, the images may be uploaded or transmitted to one or more processors that allow others to access them.

In addition, other community members' images may be used for optimizing the quality of the taken image. For example, if a flying object (airplane) is detected by neighborhood then the system of the present disclosure may use those images to identify the external object in taken images and discard it from the images. Also, valuable information about the shape of clouds may be transferred between processing units or processors to utilize image restoration and pre-processing processes.

At 106, a machine learning technique is executed to characterize the clouds in the images. A semantic segmentation method based on machine learning model may identify clouds and segment the cloud images from other objects in the image. In some embodiment, the method may include training a classifier in pixel level to identify clouds. Conditional Random Field (CRF) may smooth the output of the classifier and remove noise predictions. Deep learning segmentation methods (such as Fully Convoloution Network, CRFasRNN) may be also used to identify cloud objects and draw borders.

For example, at 108 future cloud positions may be predicted by executing a trained machine learning model. Regression models and/or time series modeling may be used to predict the next position of each pixel. The speed of cloud movement may be calculated by tracking the center of mass of the object. The speed is a factor to predict the shape of the cloud in future point in time. Other factors such as the wind speed, direction, presence of other arsenal objects in the air may dynamically reform the shape of the cloud. These information may be provided to a machine learning predictive model (such as a linear repressor) to predict the shape of the cloud.

At 110, clearness and/or cloudiness indices may be computed. For example, the sky image may be obtained as input and a number which represents the level of clearness of sky may be computed.

For example, the sky images obtained and processed at 102 and 104 may be used for estimating solar irradiation, for example, through: cloud analysis to obtain sky clearness, or cloudiness indices at 110; and cloud movement prediction to obtain future cloud coverage forecasts at 108. The method may provide a short-term prediction of the cloud layout. For example, at 108, a trained machine learning model predicts future cloud positions or layout.

The predictions performed at 108 and 110 may be shared with other network community members. For example, the predictions may be transmitted to a remote processor, which may be accessible to the other network community members. Likewise, other member's predictions may be obtained or received, for example, from such remote processor, and utilized in predicting of future cloud positions at 108 and computing of clearness and/or cloudiness indices at 110.

The output of the cloud coverage prediction at 108, in addition to other meteorological data, may be input for estimating the sun exposure and/or solar irradiation values at 112.

At 112, a machine learning model takes as input the cloud coverage prediction and forecasts solar irradiation and/or solar power. A supervised learning method (such as Regression modeling or Neural Network) may be implemented to predict solar irradiation and/or solar power. In this process, in some embodiments, training data are gathered along with associated output value (measured solar irradiation or voltage produced by solar panels). In the training phase, in some embodiments, a predictive model is built to predict the solar irradiation based on cloud coverage, arsenal emission, wind speed, time and session, and/or others.

At 114, a time series model is executed that predicts solar irradiation and/or solar power. In this step, a time series modeling method such as interpolation, extrapolation, regression analysis or curve fitting may be applied to predict the solar irradiation, for example, based on a defined size window of previous observations.

For example, the power forecast can be obtained via time-series predictions at 114 or machine learning predictions of future cloud positions at 108. The power forecasts may be dependent on each member's solar panel characteristics. The predictions may be performed and updated every time interval, for example, every few seconds or per minute.

In one aspect, both processes at 112 and 114 determine solar irradiation. The processing at 114 focuses on the overall trend which can capture more general factors such as seasons and temperatures while the processing at 112 focuses on fast changing factors such as cloud shapes and cloud speed. In some embodiments, in order to have a more robust prediction, the outputs of both predictive models are combined (using weighted average). In some embodiments, the method may include training a trainable fusion model to combine the results.

A community based network may allow a member to share the acquired images and/or analyzed data with other members via the community based network. For example, multiple images of sky (sun and clouds) for a particular moment in time acquired by different members can improve identifying the cloud characteristics (e.g., type, thickness, and border). As membership to the network increases the number of cameras with different look or viewing angles to the image also increases. The community based network may also allow for insight sharing, for example, as a feedback for other community members to build more accurate perdition model. For instance, the analytics performed by member #1 (e.g., cloud thickness) can be complimented by the analytics performed by member #2 (e.g., cloud type) to benefit both members.

Figure 2:
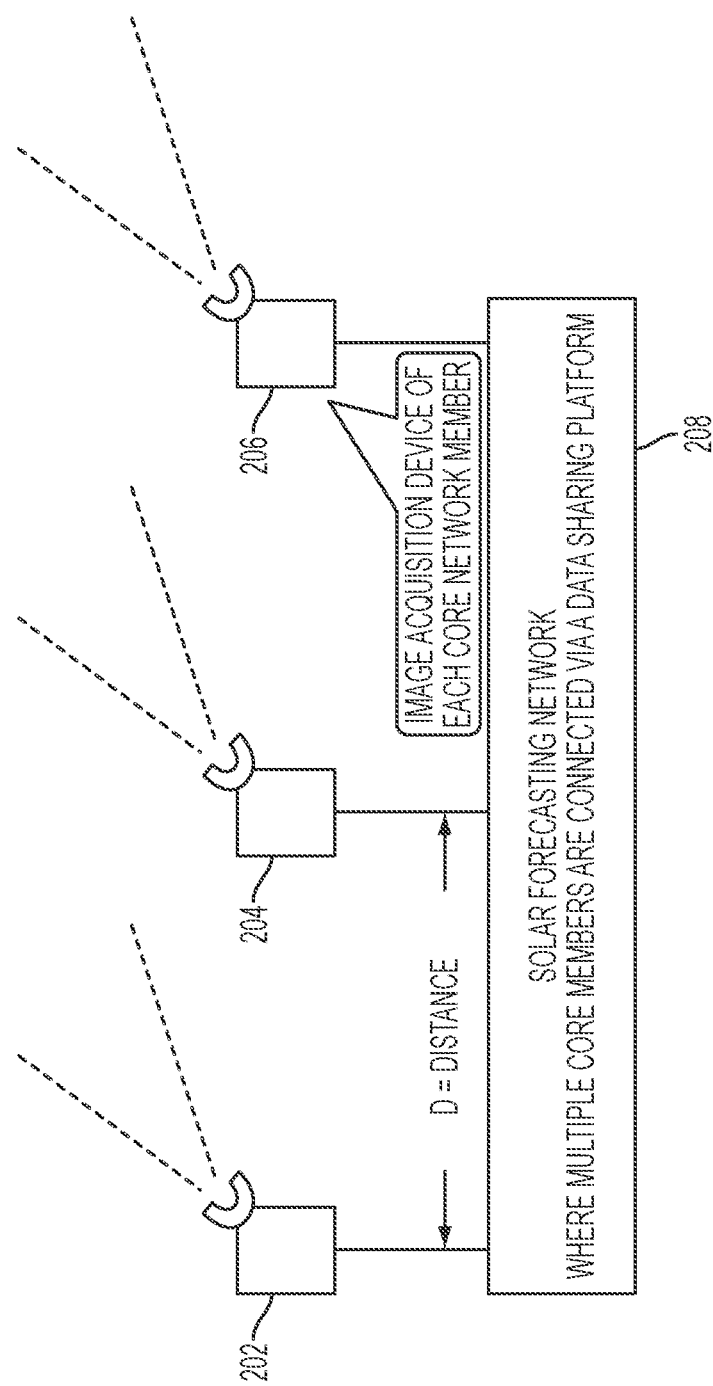
FIG. 2 shows a high level view of a solar forecasting network, for example, including community members within a solar prediction citizen network in one embodiment of the present disclosure.

FIG. 2 shows a high level view of a solar forecasting network, for example, including community members within a solar prediction citizen network in one embodiment of the present disclosure. Each core member may have an adequate image acquisition device (e.g., 202, 204, 206). A member may pre-process the image data the member acquires locally for example on the member's device. In another aspect, a member may send the raw files via a data sharing platform to be processed a central location. Predictions may be made based on the acquired data, for example, as described with reference to FIG. 1, and shared among the members, for example, to optimize their predictions, and/or extend their temporal prediction horizon. The members are connected via a data sharing platform (e.g., 208).

Figure 3:
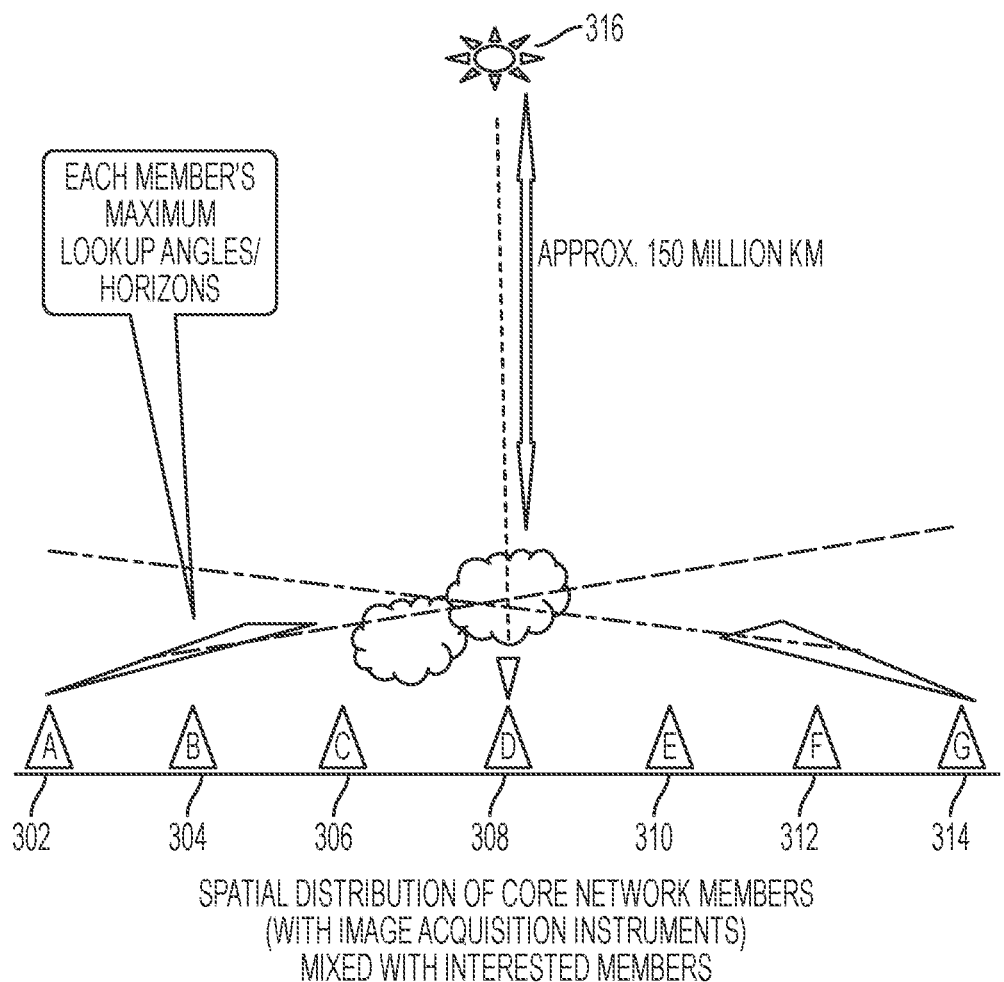
FIG. 3 shows a spatial distribution of core network members with image acquisition instruments mixed with interest members in one embodiment of the present disclosure.

FIG. 3 shows a spatial distribution of core network members with image acquisition instruments mixed with interest members in one embodiment of the present disclosure. Consider that house A 302, D 308 and G 314 are core members of the solar forecasting network. Each member has a point of view restricted by the local Hour Angle and Declination. Analyzing these separate field of view (FOV) simultaneously may eliminate the solar forecasting's circumsolar region challenge.

This challenge prevents accurate cloud boundary registration at the circumsolar region. House D 308 may not be able to ascertain a given cloud's boundary because of its direct line of sight with the Sun 316 but A 302 and G 314 may be far enough to get glimpses of that same cloud's boundary.

In another embodiment, all core members may be able to capture enough images to allow the leveraging of machine learning to catalog cloud shape morphology. This catalog of shapes may be used to determine a probability distribution of the shape a given cloud will take if it transitions across the sun. This determination may eliminate the circumsolar saturation/forward scattering challenge.

Houses B 304, C 306, E 310 and F 312 are non-member houses in-between the core members (A 302, D 308, G 314) but they themselves are not part of the network. These houses can nonetheless benefit from the predictions of their network neighbors by subscribing for their neighbors predictions. A machine learning technique may be used to estimate the actual cloud cover above non-member houses by analyzing the predicted future cloud positions and shape morphology. A non-member, for example, may subscribe to this service of estimating the cloud cover. An economic incentive may be offered to the non-members for joining the network as a core member.

Figure 4:
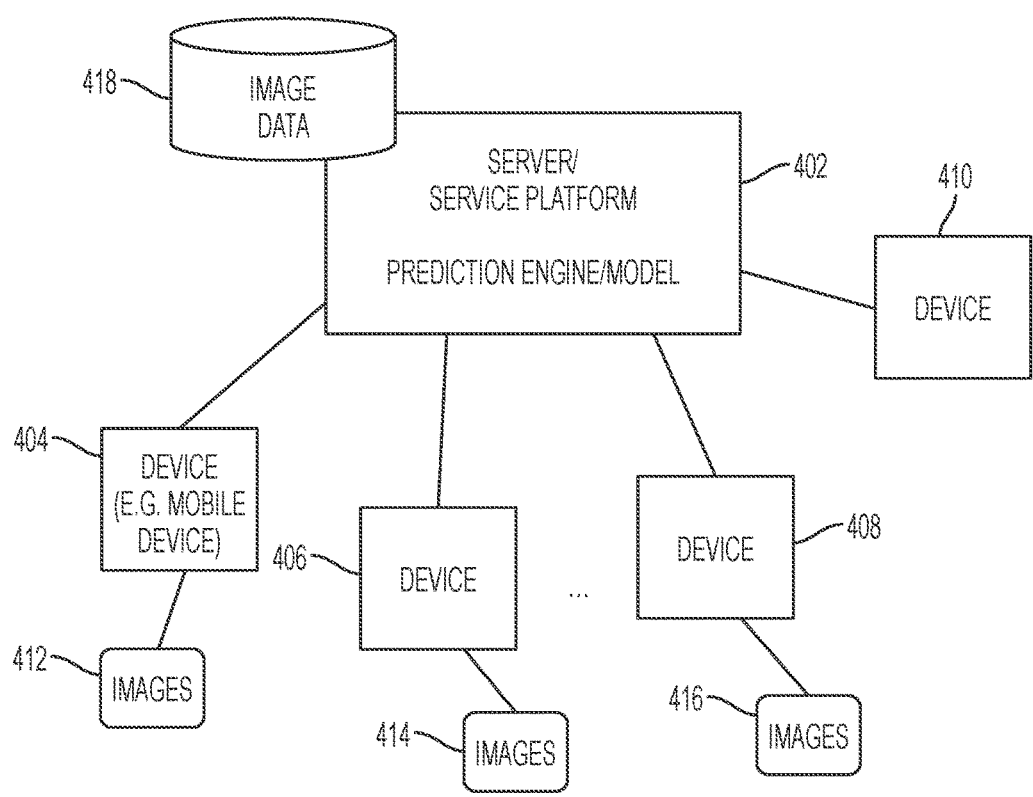
FIG. 4 is a diagram illustrating components of a system in one embodiment of the present disclosure.

FIG. 4 is a diagram illustrating components of a system in one embodiment of the present disclosure. Image processing and/or solar irradiation and/or power prediction, for example, described above, may be performed on a local device or a central device 402 located remotely from the local device (e.g., 404, 406, 408). A system may include a computer device or processor (e.g., any one of 402, 404, 406, 408) that receives images (e.g., 412, 414, 416) of a sky including cloud images as input and predicts solar irradiation and/or power based on the cloud images. The images may have been taken by the device (e.g., 404), for example, a camera or another image acquisition device coupled locally to the device (e.g., 404). An example may include a mobile or smartphone. In another aspect, images may have been taken by a device (e.g., 404, 406, 408) and received by the central device (e.g., 402), for example, via a communication network.

The central device 402 may be coupled to a database storage and may store the images (e.g., 412, 414, 416) received from a plurality of devices (e.g., 404, 406, 408). The central device 402, for example, may be a component of a cloud computing environment platform. Briefly, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud computing environment is service oriented with a focus on statelessness, low coupling, modularity, and semantic interoperability. At the heart of cloud computing is an infrastructure that includes a network of interconnected nodes.

The terrestrial sky images including cloud images (clouds covering the sky), for example, may be crowd sourced from difference user or member devices (e.g., 404, 406, 408). For instance, the images may have been acquired by a plurality of community network members and uploaded or transmitted to a central device 402 and stored in a database 418. Any one of the devices may also use the images acquired by one or more other devices. For instance, the image data uploaded to the central device 402 and stored in the database 418 may be transmitted to one or more of the devices 404, 406, 408, for use in solar irradiation and/or power prediction of a geographic area. The input may also include cloud-sun line of vision angles used to determine geographic location of the cloud image.

A model generator component executing on the computer device (e.g., 402, 404, 406, 408) takes the cloud images and geographic location where the cloud images were taken to generate a model that predicts solar irradiation for a geographic area, for example, as described with reference to FIG. 1. Based on the solar irradiation, the model may also predict solar power.

A signal that represents a power prediction over time for the geographic area may be output. The signal output may be provided to a utility company, another power provider, and others.

In one aspect, a component executing on one or more processors (e.g., at 402) may determine financial impact of the power prediction, and provide a credit payment for one or more individuals providing cloud images. For example, the prediction can help the system to save energy consumption (e.g., by switching to solar energy and disconnecting from grid) for a period of time without sacrificing the comfort of the household. As another example, in solar factories, the prediction can help by allowing more energy to be provided (e.g., switching on some reserved panels) to recover the loss of generated energy due to losing the solar irradiation.

A non-member device (e.g., 410), for example, may subscribe to this service of estimating the cloud cover. For example, a non-member device does not provide a sky or cloud image, but a service 402 may be able to compute and predict the solar irradiation and/or power for the non-member (e.g., for the geographic area of the non-member), and provide the information to the non-member device. An economic incentive may be offered to the non-members for joining the network as a core member.

Figure 5:
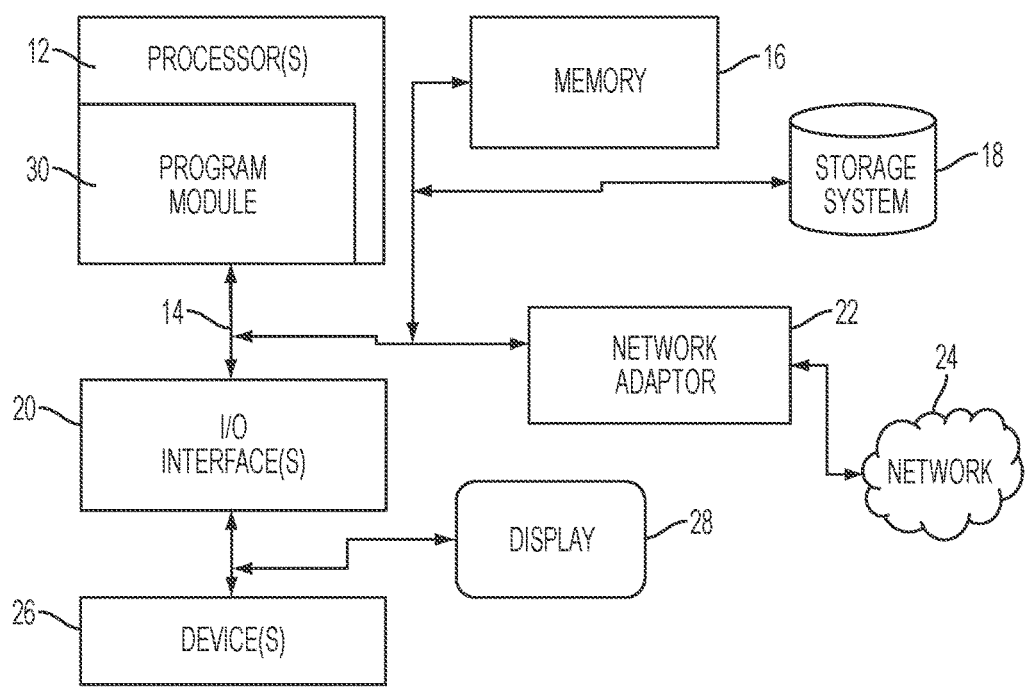
FIG. 5 illustrates a schematic of an example computer or processing system that may implement a solar radiation forecasting system in one embodiment of the present disclosure.

FIG. 5 illustrates a schematic of an example computer or processing system that may implement a solar radiation forecasting system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a prediction module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of determining solar irradiation, the method performed by at least one hardware processor, comprising:
    receiving as input terrestrial sky images including at least cloud images, the terrestrial sky images taken from a plurality of geographic locations by a plurality of devices participating as community members, the plurality of geographic locations having different viewing angles to clouds represented in the cloud images, wherein the input terrestrial sky images include at least images taken from different viewing angles from the Earth, the receiving further including receiving a result of a predictive analysis performed locally by a community member based on the community member's local data, wherein the result of the predictive analysis performed locally by the community member among the community members is shared and used as a feedback to improve another community member's predictive analysis;
    characterizing clouds in the terrestrial sky images using simultaneously separate fields of views represented in the input terrestrial sky images and using as a feedback the result of the predictive analysis performed locally by the community member;
    predicting future shape and position of the characterized clouds by executing a first machine learning model trained to predict cloud positions based on cloud speed, wind speed and direction;
    generating a second machine learning model that predicts solar irradiation in a geographic area based on cloud shape and position;
    executing the second machine learning model to predict the solar irradiation based on the future shape and position of the clouds predicted by the first machine learning model;
    executing a time series model that captures seasons and temperatures to predict another solar irradiation; and
    outputting a signal representing a combination of the solar irradiation and said another solar irradiation.

2. The method of claim 1, wherein the solar irradiation and the another solar irradiation are combined based on weights to provide a weighted solar irradiation combination.

3. The method of claim 2, further comprising:
    determining solar power based on the weighted solar irradiation combination and solar panel characteristics associated with a solar panel in the geographic area.

4. The method of claim 1, wherein the terrestrial sky images are crowd sourced from a community network including at least the plurality of devices.

5. The method of claim 1, wherein the method is performed at a central service platform receiving the terrestrial sky images uploaded from the plurality of devices.

6. The method of claim 1, wherein the method is performed by one of the plurality of devices sharing the terrestrial sky images from the plurality of devices.

7. The method of claim 1, wherein the signal is provided to an entity not involved in acquiring the terrestrial sky images.

8. A computer program product for determining solar irradiation, the computer program product comprising a computer readable storage medium having program instructions embodied therewith, the program instructions readable by a device to cause the device to:

receive as input terrestrial sky images including at least cloud images, the terrestrial sky images taken from a plurality of geographic locations by a plurality of devices, the plurality of geographic locations having different viewing angles to clouds represented in the cloud images, wherein the input terrestrial sky images include at least images taken from different viewing angles from the Earth, the device further caused to receive a result of a predictive analysis performed locally by a community member based on the community member's local data, wherein the result of the predictive analysis performed locally by the community member among the community members is shared and used as a feedback to improve another community member's predictive analysis;

generate a model that predicts solar irradiation in a geographic area based on the input terrestrial sky images and the geographic locations from where the terrestrial sky images were taken by at least using simultaneously separate fields of views represented in the input terrestrial sky images and using as a feedback the result of the predictive analysis performed locally by the community member based on the community member's local data;

execute the model to predict the solar irradiation;

execute a time series model that captures seasons and temperatures to predict another solar irradiation;

combine the solar irradiation and said another solar irradiation based on weights to provide a weighted solar irradiation combination; and output a signal representing the weighted solar irradiation.

9. The computer program product of claim 8, further comprising:

determining solar power based at least on the solar irradiation and solar panel characteristics associated with a solar panel in the geographic area.

10. The computer program product of claim 8, wherein the terrestrial sky images are crowd sourced from a community network including at least the plurality of devices.

11. The computer program product of claim 8, wherein the method is performed at a central service platform receiving the terrestrial sky images uploaded from the plurality of devices.

12. The computer program product of claim 8, wherein the method is performed by one of the plurality of devices.

13. The computer program product of claim 8, wherein the signal is provided to an entity not involved in acquiring the terrestrial sky images.

14. The computer program product of claim 8, wherein the model comprises a machine learning model, and generating the model comprises training the model to learn to predict solar irradiation based on the input terrestrial sky images.

15. A system of determining solar irradiation, comprising:

a hardware processor operable to receive as input terrestrial sky images including at least cloud images, the terrestrial sky images taken from a plurality of geographic locations by a plurality of devices, the plurality of geographic locations having different viewing angles to clouds represented in the cloud images, wherein the input terrestrial sky images include at least images taken from different viewing angles from the Earth, the device further caused to receive a result of a predictive analysis performed locally by a community member based on the community member's local data, wherein the result of the predictive analysis performed locally by the community member among the community members is shared and used as a feedback to improve another community member's predictive analysis;

the hardware processor further operable to generate a model that predicts solar irradiation in a geographic area based on the input terrestrial sky images and the geographic locations from where the terrestrial sky images were taken, the geographic locations determined based on cloud-sun line of vision angles, wherein the model is generated by using simultaneously separate fields of views represented in the input terrestrial sky images and using as a feedback the result of the predictive analysis performed locally by the community member based on the community member's local data;

the hardware processor further operable to execute the model to predict the solar irradiation;

the hardware processor further operable to execute a time series model that captures seasons and temperatures to predict another solar irradiation;

the hardware processor further operable to combine the solar irradiation and said another solar irradiation based on weights to provide a weighted solar irradiation combination; and the hardware processor further operable to output a signal representing the weighted solar irradiation.

16. The system of claim 15, further comprising:

a storage device coupled to the hardware processor, the storage device storing the terrestrial sky images taken from a plurality of geographic locations by a plurality of devices, wherein the terrestrial sky images are crowd sourced from a community network including at least the plurality of devices.

17. The system of claim 15, wherein the hardware processor is further operable to determine solar power based at least on the solar irradiation and solar panel characteristics associated with a solar panel in the geographic area.

18. The system of claim 15, wherein the model comprises a machine learning model.

* * * * *